Sept. 15, 1959 R. L. CARLSTEDT 2,903,915
TANGENTIAL SUPPLY OF OIL THROUGH THE WORK CLAMP
Filed Feb. 27, 1957 2 Sheets-Sheet 1
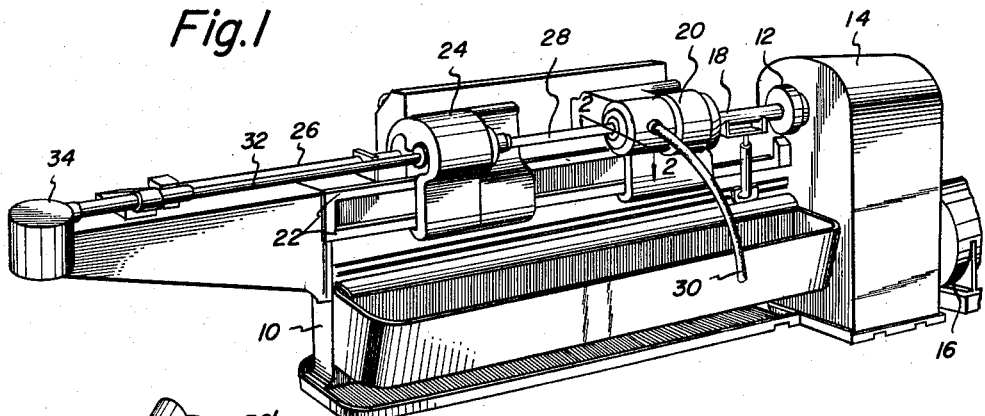
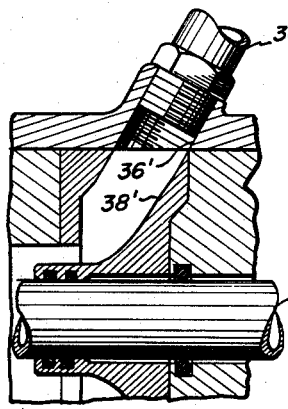
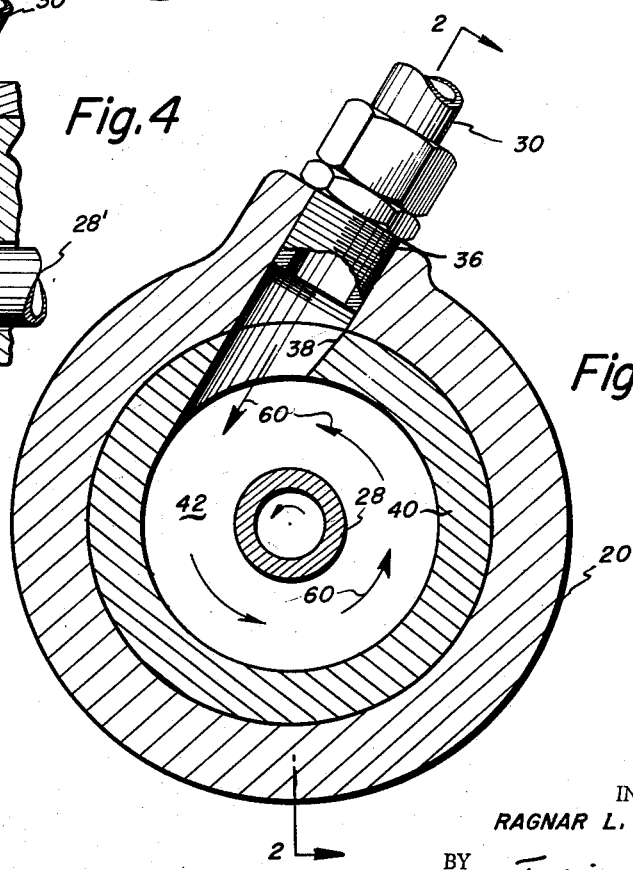
INVENTOR.
RAGNAR L. CARLSTEDT
BY
Attorneys Sept. 15, 1959    R. L. CARLSTEDT    2,903,915
TANGENTIAL SUPPLY OF OIL THROUGH THE WORK CLAMP
Filed Feb. 27, 1957    2 Sheets-Sheet 2

INVENTOR
RAGNAR L. CARLSTEDT
By
Attorneys

United States Patent Office 2,903,915
Patented Sept. 15, 1959

2,903,915

TANGENTIAL SUPPLY OF OIL THROUGH THE WORK CLAMP

Ragnar Leonard Carlstedt, Cincinnati, Ohio, assignor to The R. K. LeBlond Machine Tool Co., Cincinnati, Ohio, a corporation of Delaware Application February 27, 1957, Serial No. 642,811

7 Claims. (Cl. 77—3)

This invention relates to boring machines and, in particular, to a boring machine adapted for the boring of deep holes in workpieces at high speed.

A boring machine of the general nature with which the present invention is concerned is generally illustrated and described in my previously filed copending applications, viz: Serial No. 444,559, filed July 20, 1954, issued as Patent No. 2,795,977, dated June 18, 1957; Serial No. 410,548, filed February 16, 1954, issued as Patent No. 2,878,693, dated March 24, 1959; Serial No. 461,887, filed October 12, 1954, issued as Patent No. 2,845,823, dated August 5, 1958; and Serial No. 410,353, filed February 15, 1954, issued as Patent No. 2,842,984, dated July 15, 1958.

In my copending application, Serial No. 461,887, filed October 12, 1954, Patent No. 2,845,823, dated August 5, 1958, there is shown an arrangement for preventing the cooling and lubricating oil supply to the boring bar of a machine of this nature from impinging directly against the boring bar at the point where the coolant is supplied, thereby to prevent deflection or vibration of the boring bar by this cooling fluid supply.

This is an important provision in the machine because the cooling fluid supply is at extremely high pressure up to 600 to 800 pounds per square inch, or more, whereby to provide for a copious supply of the cooling fluid, whereby the boring tool and work are adequately cooled and lubricated and the chips flushed away while, also, the supply of high pressure lubricant to the exterior of the tubular boring bar assists in holding the boring bar steady against deflection and vibration and provides, in effect, an elongated, highly efficient cushion bearing.

The boring machine arrangement of the present invention utilizes a non-rotating boring bar which is moved axially relative to the work while the work is driven in rotation. This arrangement always provides for a true cylindrical hole coaxial with the rotation of the workpiece. It will be evident, however, that the film of oil adjacent the surface of the workpiece will be turning with the workpiece as the boring of the hole being made progresses.

The particular object of the present invention is the provision of an arrangement for supplying coolant such as oil or the like to the boring tool in a boring machine of the nature referred to in which the high pressure incoming cooling fluid is prevented from causing any deflection or vibration of the boring tool.

A still further object is the provision of an apparatus and method of supplying a cooling fluid to the boring tool in a boring machine of the nature referred to in which there is a minimum of power loss occasioned by the forcing of the oil through the space between the non-rotating boring tool and the rotating workpiece.

A still further object is the provision of a method and apparatus for supplying a cooling fluid or cooling agent such as cutting oil to the boring tool of a boring machine of the nature referred to in which pressures and velocities as high as may be necessary can be employed in connection with the fluid without causing any vibration or deflection whatsoever of the boring tool.

These and other objects and advantages of this invention will become more apparent upon reference to the following specification taken in connection with the accompanying drawings, wherein:

Figure 1 is a perspective view of a boring machine constructed so as to embody the present invention;

Figure 3 is a transverse section indicated by line 3—3 on Figure 2 showing the manner in which the oil inlet is formed, so that the oil supply into the workpiece clamp is tangential to the boring tool; and Figure 4 is a rather diagrammatically, somewhat simplified illustration showing a modified manner of arranging the cooling fluid inlet ports in the workpiece clamp.

Figure 2:
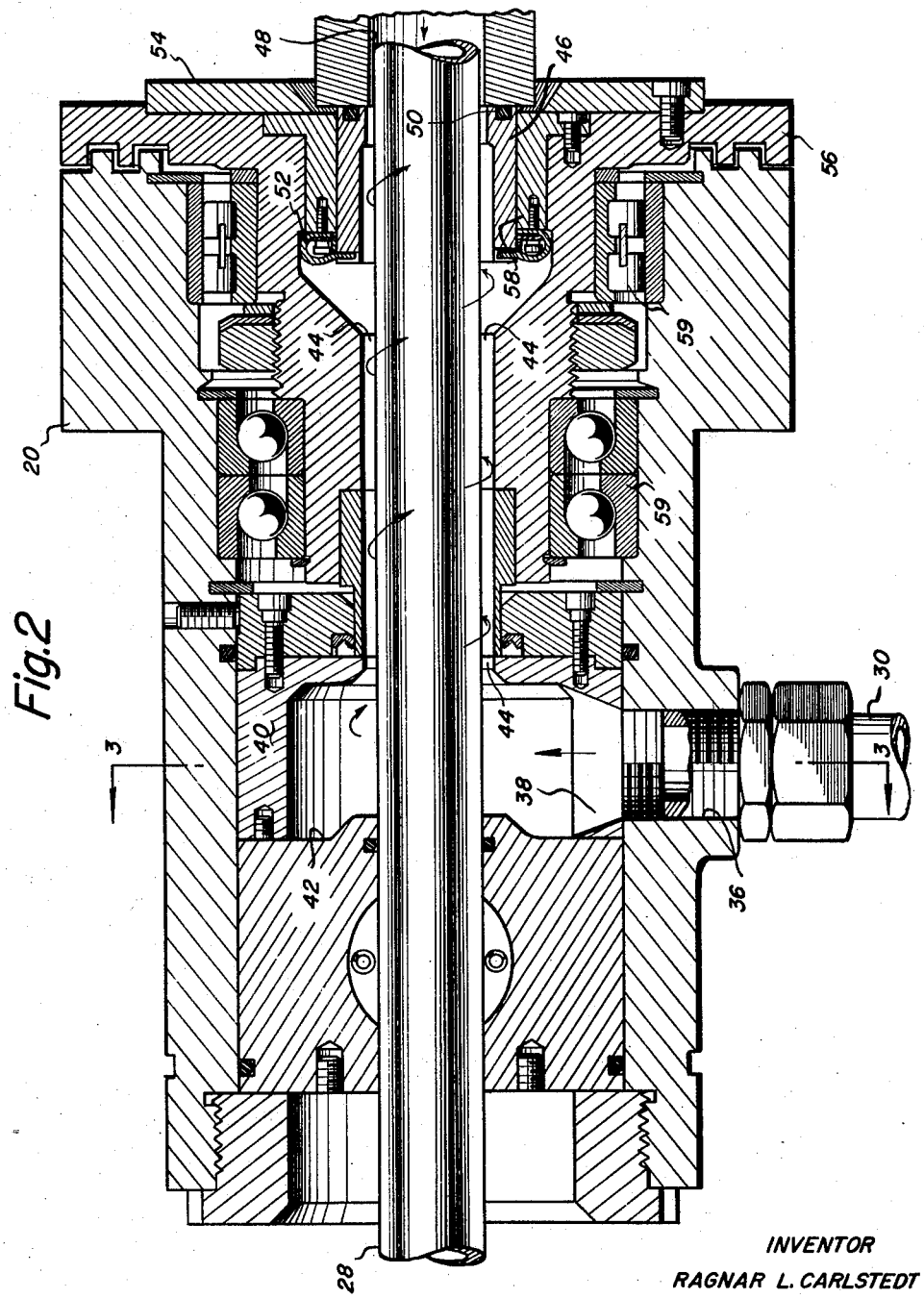
Figure 2 is a sectional view indicated substantially by line 2—2 on Figure 1, and constituting a section through the workpiece clamp.

Referring to the drawings somewhat more in detail, the machine generally illustrated therein comprises a frame 10 comprising at one end a spindle 12 adapted for being driven by belts or the like located within a casting 14 at one end of the frame, and which belts or the like are arranged for being driven by an electric motor 16.

The workpiece that is to be bored is indicated at 18, and has its end opposite spindle 12 engaged by a clamp 20 that has a rotary member to engage the end of the work, so that as the work is driven by the spindle 12 the end thereof that is engaged by clamp 20 will also rotate freely. Clamp 20 is slidable on frame 10 as along the ways 22, and may be provided with a hydraulic motor for moving it if so desired.

The frame 10 also slidably supports a boring slide 24 which is provided with a hydraulic motor 26 adapted for reciprocating the boring slide along ways 22, the boring slide supports a tubular boring bar or cutting tool 28 which extends sealingly into the end of clamp member 20 opposite workpiece 18.

It will be evident that rotation of workpiece 18 accompanied by rightward movement of boring slide 24 will result in boring a hole in the workpiece 18.

According to the present invention, there is a supply of a cooling agent, such as cutting oil, through clamp member 20 into the space between the boring bar and the workpiece via a conduit 30. This cooling fluid passes along the boring bar to the outer cutting end thereof, and then backwardly through the hollow boring bar into the telescopic piping arrangement 32 which has one part connected with boring slide 24 so as to communicate with the left end of hollow boring bar 28, and another part entering tangentially into a cyclone receiver 34 whence the oil passes to a filter or settling chamber or the like not shown in the drawings, and wherein the chips are separated from the cutting oil before the oil is returned to the pressure side of the coolant system.

Referring now to Figures 2 and 3, it will be seen that conduit 30 enters clamp 20 through a port 36 in the wall of the stationary casing of the said frame, and that port 36 communicates through a port 38 in a sleeve or collar member 40 within the casing with a chamber 42 that surrounds the boring bar 28.

The chamber 42 communicates via annular passages 44 with the interior of the sealing sleeve 46 and thence with bore 48 in workpiece 18. It will be noted that sleeve 46 is provided with an O ring 50 that engages the end of the workpiece, and that the inner end of sleeve 46 which is subjected to the pressure of the cooling fluid is larger than the area inwardly of sealing ring 50 whereby the sleeve 46 is positively held in sealing engagement with the end of the workpiece, thereby preventing loss of the high pressure cooling fluid. The sleeve 46 is initially biased into engagement with the end of the workpiece by the spring means 52.

The sleeve 46 together with the clamp ring 54 that engages the end of the workpiece and the parts 56 and 58 attached thereto rotate within the casing of the clamp 20, and are supported therein by the antifriction bearings 59 so as to run true and vibration free within the clamp.

As will most particularly be seen in Figure 3, the conduit 30 and the ports 36 and 38 through which the conduit communicates with chamber 42 are set at an angle to the transverse axis of the clamp whereby the coolant supply is tangential to the chamber 42, as indicated by the arrow 60. This tangential supply of the cooling fluid not only prevents the fluid from impinging against the boring bar 28 whereby the boring bar could be deflected or caused to vibrate, but it also sets the oil into rotation in the same direction as the workpiece and the part 58 and the sleeve 46 of the clamp are rotating whereby there is considerably less turbulence created in the oil and thus less foaming thereof and less frictional drag of the oil on the rotating parts than is the case when the oil is introduced axially or radially into the clamp.

The advantage of setting the oil into rotation is realized throughout the length of the boring bar, because rotation of the oil exists throughout the length of the bore along which it passes. There is thus a power savings effected which is appreciable due to the high speed of operation of the boring machine according to the present invention.

It will be understood that the supply of the cooling fluid could, in addition to being tangential, also be in a somewhat axial direction as diagrammatically illustrated in Figure 4. In this figure, the ports 36' and 38' are tilted so that the incoming cooling fluid has an axial component imposed on its tangential direction; and, this effects a further energy saving in that the direction of travel of the fluid does not have to be changed so abruptly from the time it enters the clamp until it passes along the bore of the workpiece.

Figure 4 also illustrates the manner in which the advantages of the present invention could be combined with a bushing arrangement extending about the boring bar so that even the small amount of turbulence that might be created in the cooling fluid when introduced into the clamp, in accordance with the present invention, is prevented from having any effect on the boring bar.

It will be noted that the point in the clamp where the high pressure cooling fluid enters is spaced substantially distant rearwardly from the point where the clamp engages the workpiece. The connecting passage between the said inlet connection for the cooling fluid and the end of the clamp that engages the workpiece has a relatively small clearance about the boring bar, so that the cooling fluid in passing along the clamp assists in supporting and cushioning the boring bar against vibration thereby contributing to the trueness and straightness of the bore made in the workpiece.

It will be understood that this invention is susceptible to modification in order to adapt it to different usages and conditions; and, accordingly, it is desired to comprehend such modifications within this invention as may fall within the scope of the appended claims.

I claim:

1. In a boring machine of the nature described; a workpiece clamp adapted for sealingly engaging the end of a workpiece being operated, a boring bar extending axially through the clamp and engaging the end of the workpiece thereby to bore the workpiece as it is rotated, said clamp having a cylindrical chamber through which the boring bar extends, and means for supplying coolant at high velocity and under pressure tangentially into the chamber in the clamp about the boring bar whereby the coolant is supplied along the outside of the boring bar to the bore in the workpiece while direct impingement of the incoming high velocity fluid against the boring bar is prevented.

2. In a boring machine; a workpiece clamp having a rotatable member at one end adapted for sealingly engaging and supporting a workpiece, a boring bar adapted for being inserted longitudinally through the clamp into engagement with the end of the workpiece thereby to bore the workpiece as the same rotates, said boring bar being sealed to the clamp at the end of the clamp opposite the engagement thereof with the workpiece, said clamp having a cylindrical chamber through which the boring bar extends, and a fluid connection entering the clamp tangentially of the said chamber therein between the said seal and the workpiece to provide for a supply of cooling fluid under high pressure and at high velocity into the clamp around the boring bar in such a manner that the incoming high velocity fluid does not impinge directly on and deflect the boring bar while the said fluid is available for supply along the outside of the boring bar into the workpiece being supplied.

3. In a boring machine; a workpiece clamp having a rotatable member on one end to clamp a workpiece against a driven spindle, a boring bar thrust through the clamp from the other end to engage the end of the workpiece and bore the workpiece as the same rotates, a seal between the clamp and the boring bar at the said other end of the clamp and a seal between the clamp and the workpiece at the workpiece end of the clamp, means in the clamp between the seals forming a cylindrical chamber about the boring bar, and a fluid inlet entering tangentially into the chamber in the clamp between said seals thereby to supply cooling fluid at high velocity and under high pressure to the chamber about the boring bar but without the said fluid impinging directly on the boring bar and thus causing deflection thereof, the direction of rotation of the fluid caused by the tangential entry thereof into the chamber being in the same direction as the direction of rotation of the workpiece.

4. In a boring machine; a frame, a spindle having a driven work engaging member, a workpiece clamp on the frame having a rotatable end part adapted to engage the end of the workpiece opposite the spindle end thereof thereby to clamp the workpiece against the spindle for rotation thereby, a hollow boring bar extending through the clamp and engaging the end of the workpiece, a seal between the clamp and the workpiece and a seal between the clamp and the boring bar at the end of the clamp opposite the workpiece, means in the clamp between the seals forming a cylindrical chamber about the boring bar, a fluid inlet formed in the clamp for admitting cooling fluid therein tangentially of said chamber so that the fluid will flow about the boring bar into the bore in the workpiece and flush chips outwardly through the hollow boring bar, and means for supplying fluid under high pressure to said inlet.

5. In a boring machine, a frame, a spindle having a driven work engaging member, a workpiece clamp on the frame having a rotatable end part adapted to engage the end of the workpiece opposite the spindle end thereof thereby to clamp the workpiece against the spindle for rotation thereby, a hollow boring bar extending through the clamp and engaging the end of the workpiece, a seal between the clamp and the workpiece and a seal between the clamp and the boring bar at the end of the clamp opposite the workpiece, a fluid inlet formed in the clamp between the seals for admitting cooling fluid therein so that the fluid will flow about the boring bar into the bore in the workpiece and flush chips outwardly through the hollow boring bar, there being a cylindrical chamber in the clamp about the boring bar in the region of the inlet and the said inlet opening into the chamber tangentially thereof whereby the axis of the inlet and the axis of the boring bar are offset from each other and the fluid is prevented from impinging directly against the boring bar, the direction of rotation of the fluid in the chamber being the same as the direction in which the workpiece rotates whereby the drag of the fluid on the workpiece is reduced.

6. In a boring machine, a frame, a spindle having a driven work engaging member, a workpiece clamp on the frame having a rotatable end part adapted to engage the end of the workpiece opposite the spindle end thereof thereby to clamp the workpiece against the spindle for rotation thereby, a hollow boring bar extending through the clamp and engaging the end of the workpiece, a seal between the clamp and the workpiece and a seal between the clamp and the boring bar at the end of the clamp opposite the workpiece, a fluid inlet formed in the clamp between and seals for admitting cooling fluid therein so that the fluid will flow about the boring bar into the bore in the workpiece and flush chips outwardly through the hollow boring bar, there being a cylindrical chamber in the clamp about the boring bar in the region of the inlet and the said inlet opening into the chamber tangentially thereof whereby the axis of the inlet and the axis of the boring bar are offset from each other and the fluid is prevented from impinging directly against the boring bar, the direction of rotation of the fluid in the chamber being the same as the direction in which the workpiece rotates whereby the drag of the fluid on the workpiece is reduced, said chamber being spaced a substantial distance away from the workpiece end of the clamp and there being a relatively small bore connecting the chamber with the workpiece end of the clamp and through which the boring bar extends whereby the high pressure high velocity cooling fluid provides an elongated cushion bearing for the boring bar.

7. In a boring machine of the nature described, a clamp adapted for clamping an elongated workpiece against a spindle to be rotated thereby, a hollow boring bar adapted for engaging the end of the workpiece through the clamp, a seal between the clamp and the boring bar at one end of the clamp and a seal between the clamp and the workpiece at the other end of the clamp, an inlet formed in the clamp between the seals and adjacent the end thereof opposite the workpiece for admitting cooling fluid under pressure and at high velocity into the clamp, said clamp having a cylindrical chamber larger than the boring bar into which the inlet opens, said inlet being directed tangentially of the chamber so that the fluid does not impinge directly against the boring bar but instead rotates thereabout and in the same direction as the workpiece rotates, and said inlet also being inclined toward the workpiece end of the clamp to impart a component of velocity to the fluid toward the workpiece, said clamp including a relatively elongated passage smaller than said chamber leading from said chamber to the workpiece end thereof surrounding the boring bar and through which said fluid passes whereby the cooling fluid provides an elongated cushion bearing for the boring bar, there being a bushing in said clamp closely surrounding the boring bar and extending through said chamber and against which the fluid impinges thereby further protecting the boring bar against impingement of the fluid thereagainst.

References Cited in the file of this patent

UNITED STATES PATENTS

| | | |
|---|---|---|
| 2,552,463 | Searles | May 8, 1951 |

FOREIGN PATENTS

| | | |
|---|---|---|
| 543,024 | France | May 26, 1922 |
| 1,096,352 | France | June 20, 1955 |